Figure 1:
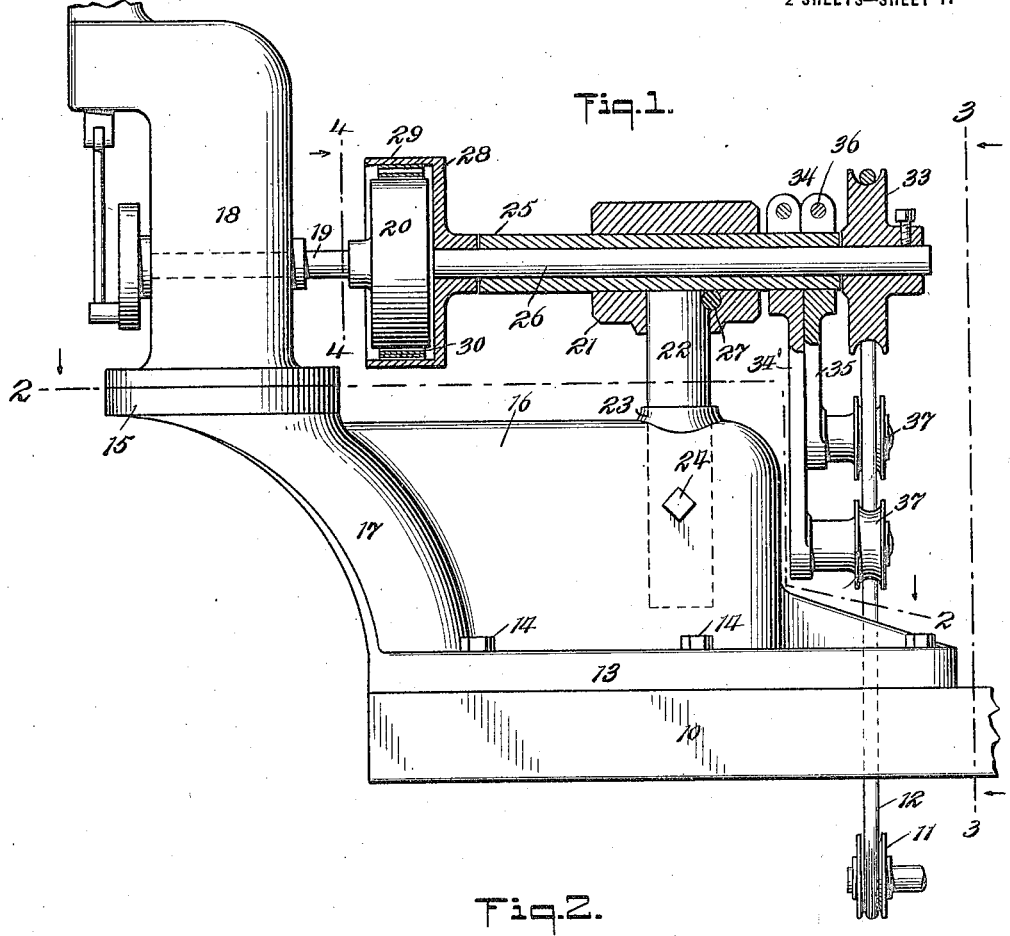

J. KORNAS.
SEWING MACHINE DRIVE.
APPLICATION FILED SEPT. 9, 1918.
1,386,632.
Patented Aug. 9, 1921.
2 SHEETS—SHEET 2.
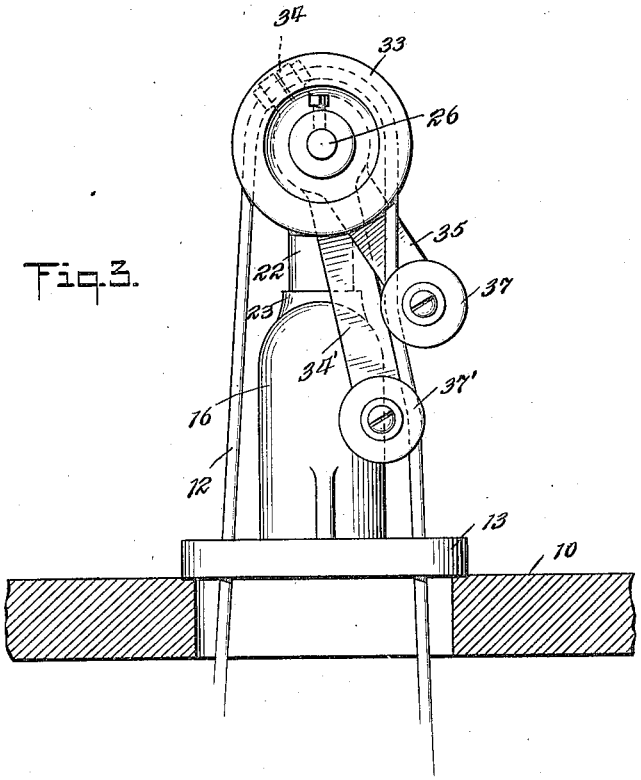
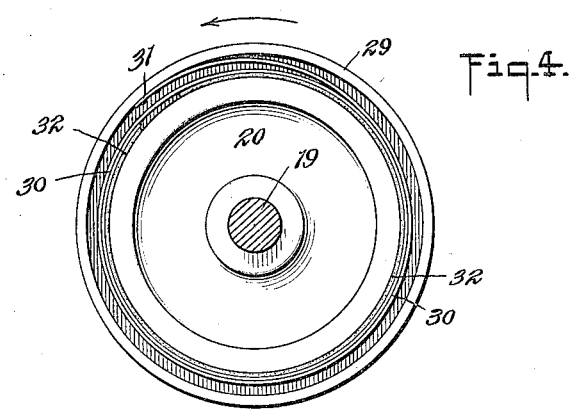
WITNESSES
INVENTOR
Joseph Kornas
BY
Hillary C. Messimer
ATTORNEYS

UNITED STATES PATENT OFFICE.

JOSEPH KORNAS, OF LINDEN, NEW JERSEY, ASSIGNOR TO FELDMAN MACHINE WORKS, INC., A CORPORATION OF NEW YORK.

SEWING-MACHINE DRIVE.

1,386,632. Specification of Letters Patent. Patented Aug. 9, 1921.

Application filed September 9, 1918. Serial No. 253,130.

*To all whom it may concern:*

Be it known that I, JOSEPH KORNAS, a citizen of the United States, and resident of Linden, in the county of Union and State of New Jersey, have invented certain new and useful Improvements in Sewing-Machine Drives, of which the following is a specification.

The invention relates in general to a power transmission for driving any one of a plurality of replaceable machines from a relatively fixed source of rotary power and specifically relates to a combined locating support for different characters of machines, such as sewing machines, and a driving connection for the several machines designed to be carried by the said support.

In some situations, such for instance as in fabric and hat sewing factories, it is usual for the operator seated in front of the work table to mount one kind of sewing machine in position on the work table for doing a certain class of work and to replace the previous machine with a different type of machine in order to operate on another class of work. Such machines are usually equipped with some form of driving pulley which differ from each other in both the size of the driving pulley and in the position of its axis of rotation relative to the plane of its supporting base. It has been necessary heretofore to provide a different transmission with every different machine mounted on the work table and this different transmission necessitated a previous readjustment of the driving connection therewith. This remounting of both the machine itself and its driving transmission becomes quite burdensome when it is taken into consideration that an operator may desire to change the machine every few minutes.

Accordingly, one of the objects of the invention is to provide a simple form of transmission which can be readily adjusted to connect with the differently disposed power pulleys on the machine when mounted in position. Incidental to this object it is a desideratum in such devices to provide quickly a substantially straight line drive between the transmission and the power pulley of the driven machine without stopping to insure a mathematically exact alinement of the respective axes of rotation.

Another object of the invention is to provide a transmission which can be quickly connected to the driving element of the machine without the exercise of any particular care in insuring a secure clutching of the parts.

A still further object of the invention is to provide, in those situations where a belt drive is utilized, an organization of belt tighteners so arranged that slack in the driving belt is automatically taken up in the several adjusted positions of the transmission.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Referring to the accompanying drawing:—

Figure 2:
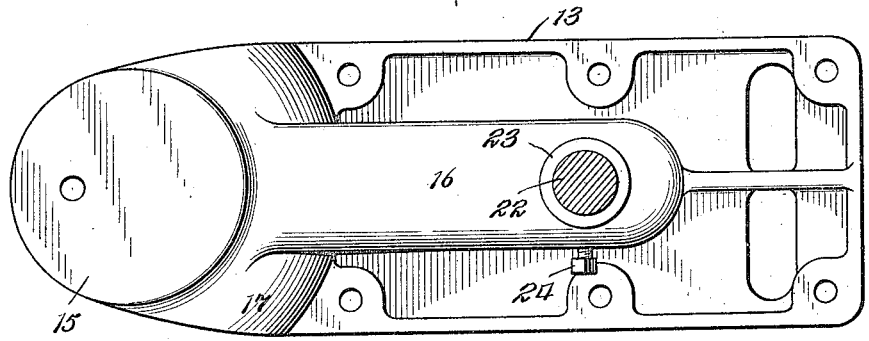

Figure 1 is a view in side elevation of an organization of power work table parts showing a preferred embodiment of my invention as part of the organization; certain parts of the driving elements and bearings therefor are shown in axial section to illustrate details of construction;

Fig. 2 is a horizontal sectional view of the base portion of the device shown in Fig. 1, and taken on the broken line 2—2 of Fig. 1 and looking downward toward the base of the transmission, Fig. 3 is a view in end elevation of the machine shown in Fig. 1 looking at the same from the line 3—3 of Fig. 1; and Fig. 4 is a vertical transverse sectional view of the parts at the clutch member and taken on the line 4—4 of Fig. 1 looking in the direction indicated by the arrow on this line.

In the following description and in the claims, parts will be identified by specific names for convenience of expression but they are intended to be as generic in their application to similar parts as the art will permit.

In the drawings there is shown a conventional form of work table 10, beneath which is mounted the power mechanism for driving the several machines, which power mechanism is indicated diagrammatically by the pulley 11. The pulley 11 is engaged by a belt 12 and extends through suitable openings in the work table 10 as is usual in such constructions. It is also usual to mount the driven machine so that the tool part thereof extends beyond the edge of the work table and thus provides an open space beneath the machine to accommodate the operator or the piece of work upon which the machine is operating. Accordingly the transmission particularly forming the subject matter of this invention, comprises a base 13 suitably fastened to the work table by means of bolts 14 and which base has extending upwardly and outwardly therefrom a machine supporting bed 15 projecting beyond the adjacent edge of the work table 10. The base portion includes a long upstanding hollow dome constituting a standard 16, one end of which is enlarged laterally and projects beyond the adjacent edge of the base to provide a wide spreading bracket 17 for supporting the machine supporting bed 15.

A machine 18 designed to be driven from the power member 11 is mounted on the bed 15 and is fastened thereto as is usual in the mounting of sewing machines and other replaceable machines designed to operate with the disclosed transmission. These machines are characterized by the fact that the power shaft 19 thereof are provided at their outer ends with pulleys 20 which may be of any conventional form and which in the case of a sewing machine is the usual hand wheel found in such machines. A feature of this invention is that no particular form of pulley 20 is necessary to effect the connection with the transmission as hereinafter described and it is therefore unnecessary to modify the conventional forms of pulleys in order to drive the same from the transmission herein disclosed. The transmission is provided with a vertically adjustable frame 21 which includes a depending post 22 positioned in a boss 23 formed in the upper portion of the standard. The frame is held in its vertically adjusted position by means of a binding screw 24 threaded into the side of the standard and designed to engage the side of the post. A long horizontally extending sleeve 25 is slidably mounted in the frame for movement to and from the pulley 20 and projects laterally from opposite sides of the frame so as to permit of any necessary movement horizontally of the clutch member hereinafter described. This sleeve constitutes a long bearing for a drive shaft 26 which extends beyond opposite ends of the sleeve and is movable therewith. A set screw 27 carried by the frame engages the sleeve to hold the same, and with it the shaft, against longitudinal movement. A clutch member 28 for engaging the pulley 20 is fixed to one end of the shaft 26. This clutch member includes an open end hollow drum 29 having an internal diameter somewhat larger than the pulley 20 and designed to telescope the pulley when in operative engagement therewith. A flat spiral spring 30 has its outer end fastened to the inner face of the drum by means of rivets 31 shown in Fig. 4, and the inner ply of this spring is faced with a felt pad 32 designed, when the drum is traveling in the direction indicated by the arrow in Fig. 4, to frictionally clutch the periphery of the pulley and rotate the same in its machine-actuating-direction.

The opposite end of the shaft 26 is provided with a drive pulley 33 engaged by the belt 12 to rotate the same from the power member 11. The portion of the sleeve between the pulley 33 and adjacent end of the frame is provided with a belt tightener 34 designed to engage the belt 12 and take up slack therein after the pulley 33 has been adjusted incidental to the adjustment of the clutch member 28 in its engagement with the pulley 20. The belt tightener may be of any conventional form and is herein shown to include a pair of depending arms 34' and 35 each clamped by means of the bolts 36 in adjusted position on the sleeve. The arms are each provided with rollers 37 designed to engage opposite sides of one length of the belt as shown more particularly in Fig. 3.

In operation the transmission is mounted in position on the work table and the belt looped through the openings in the base therein, in case the base extends beyond the place where the belt comes through the work table. The belt is loosely positioned over the driving pulley 33 and the machine 18, in connection with which it is designed to use the transmission, is mounted in position on the machine bed. Then by loosening the securing screws 24 and 27 the frame is raised until the axis of the driving shaft 26 is approximately in line with the axis of rotation of the pulley 20. In this position the screw 24 is tightened and the clutch member 28 is moved laterally until the pulley 20 is contained within the inner coil of the spring 28. In this position the screw 27 is tightened thus locking the shaft against longitudinal movement. The belt tighteners are then adjusted about the bearing sleeve until they take up whatever slack there may be in the belt and the organization is then in position to be actuated in the usual manner. Power is transmitted from the member 11, through belt 12, pulley 33, shaft 26, drum 29, spring drive 30 to the pulley 20.

In this mounting care need not be taken that the shafts 19 and 26 be in exact alinement for the flexible connection provided between the drum and pulley 20 provides sufficient play to insure the clutch member driving the pulley even though it may be only approximately in alined position. In this manner a secure and positive drive is provided between the power member 11 and the machine 18 and this positive connection may be attained with any type of pulley 20 within the capacity of the drum 29. The spring 30 will barely coil up until there is a driving engagement between the drum and the pulley engaged by the tightly coiled spring. By re-rotating either the drum or pulley the clutching connection is loosened and the machine 18 readily removed from its engagement with the transmission.

It is obviously within the scope of the invention to provide the machine bed as an element distinct from the transmission parts but they are shown herein as one article in order to emphasize a desirable construction in which the machine bed is well offset from the edge of the work table and at the same time the transmission elements *per se* are utilized to strengthen the support for the replaceable machine as well as insure at least an approximate locating of the machine in position to be engaged quickly by the transmission.

In place of the flexible clutch herein disclosed it is obviously within the scope of the invention to utilize any known form of clutch capable of functioning as described for the preferred form illustrated and as an example of such a form a pin and slot type of clutch may be utilized.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. A device of the class described comprising a combined machine support and power transmission including a base, a machine supporting bed fixed relative thereto and adapted to receive different forms of sewing-machines including drive pulleys having their axis of rotation differently positioned vertically of the device, a drive shaft provided with clutching means at one end for engaging the differently positioned machine pulleys on the supporting bed, a drive pulley on said shaft adapted to receive a drive belt, and a support for the shaft adjustable vertically in said base for centering said clutching means relative to the machine pulley and for causing the shaft driving pulley to take up the slack of its belt.

2. In a device of the class described, the combination of a standard, a vertically shiftable shaft bearing carried by said standard, means for securing the bearing in shifted position, a drive shaft mounted in said bearing, means for driving said shaft and clutching means actuated by said shaft for engaging and rotating a machine element driven thereby, said clutching means being designed to engage the periphery of different size pulleys.

3. A device of the class described comprising a combined machine support and power transmission including a base, a machine supporting bed fixed relative thereto and adapted to receive different forms of sewing machines including drive pulleys having their axis of rotation differently positioned vertically of the device, a drive shaft provided with clutching means at one end for engaging the differently positioned machine pulleys on the supporting bed, a bearing for said shaft including a vertically extending post rotatably mounted in the base and means for securing the post and thus securing the axis of rotation of the shaft in fixed position.

4. An article of manufacture including a support of a machine having a driving pulley, power transmitting means for driving the machine including a driving shaft, means for connecting the same in driving relation to the different machine driving pulleys on the support, a journal for said shaft adjustable into different positions to cause the axis of the shaft to extend substantially in alinement with the axis of the different machine driving pulleys on the support, means for securing the bearing and thus securing the axis of rotation of the shaft in fixed position and means for securing said bearing in fixed adjusted relation to the support.

5. In a device of the class described, the combination with a machine having a driving element in the form of a conventional pulley, of a power transmission constituting an article of manufacture distinct from said machine for driving said machine, said transmission including a universal clutch member designed to engage the periphery of different size pulleys and said clutch member being in driving engagement with the peripheries of said conventional pulley.

6. In a device of the class described, the combination with a machine having a driving element in the form of a conventional pulley having a smooth periphery, of a power transmission constituting an article of manufacture distinct from said machine for driving said machine, said transmission including a universal clutch member designed to engage the peripheries of the different size pulleys, said clutch member being in driving engagement with said conventional pulley, said clutch member being adjustable in all directions to engage differently placed pulleys and means for securing the clutch member in its adjusted driving engagement with said pulley.

7. A transmission including a standard, a frame vertically adjustable in said standard, means for securing the frame in its adjusted position, a sleeve mounted in said frame for relatively horizontal movement, means for securing the sleeve relative to the frame, a shaft journaled in said sleeve and movable therewith, a clutch member carried by said shaft and power means operatively connected to said shaft to rotate the clutch member in its several adjusted positions.

8. In a device of the class described, the combination with a machine driving element mounted in position with a fixed axis of rotation, a power transmission for driving said element, said transmission including a rotating clutch element provided with flexible means for engaging and driving said element, said flexible means being distortable from normal so as to provide a positive driving connection at all times even when the axis of rotation of the clutch element is disposed at an angle to the axis of rotation of the driving element or when the size of the driving element is varied.

9. In a device of the class described, the combination with a machine driving element mounted in position with a fixed axis of rotation, a power transmission for driving said element, said transmission including a shaft, a clutch element driven by said shaft and operatively connected to said machine driving element to actuate the same, said clutch element including a spring drive engaging the driving element to compensate for variations in the off centering of the axis of rotation of the shaft and the driving element.

10. In a device of the class described, the combination of a machine pulley having a relatively fixed axis of rotation, an adjustable power shaft, a clutch fixed to one end of said shaft and including a drum adapted to telescope said pulley, and a flexible spiral spring connection between said drum and pulley whereby the shaft may drive the pulley even though the axis of the shaft be not in alinement with the axis of rotation of the pulley.

11. In a device of the class described, the combination with a rotary power member having a fixed axis of rotation, a power belt driven thereby and a machine having a driving element spaced from said belt, of a vertically adjustable transmission for operatively connecting said belt with said machine driving element, said transmission including means for securing the transmission in adjusted position whereby connections can be made with differently placed machine driving elements, said transmission also including a belt tightener for insuring a driving engagement between the belt and transmission in the several vertically adjusted positions of the transmission.

12. In a device of the class described, the combination of a standard, a vertically adjustable frame mounted in said standard, a horizontally adjustable sleeve mounted in said frame, a shaft journaled in said sleeve, a clutch member fixed to the shaft at one end of the sleeve, a driving pulley fixed to the shaft at the opposite end of the sleeve.

13. In a device of the class described, the combination of a standard, a vertically adjustable frame mounted in said standard, a horizontally adjustable sleeve mounted in said frame, a shaft journaled in said sleeve, a clutch member fixed to the shaft at one end of the sleeve, a driving pulley fixed to the shaft at the opposite end of the sleeve and a belt tightener movable with the frame and adapted to engage a belt trained about said driving pulley.

14. In a device of the class described, the combination of a standard, an adjustable frame carried by said standard, a shaft carried by said frame, a clutch fixed to one end of the shaft and adapted to engage a machine element to drive the same, a pulley fixed to the other end of the shaft and adapted to be driven by a belt, and a belt tightener movable with the pulley for tightening the belt in the several adjusted positions of the clutch and pulley.

Signed at New York city, in the county of New York and State of New York this 22nd day of August, A. D. 1918.

JOSEPH KORNAS.